United States Patent
Hayes et al.

(10) Patent No.: US 6,828,525 B1
(45) Date of Patent: Dec. 7, 2004

(54) METHOD OF ASSEMBLING AN ARTICLE USING LASER LIGHT PROJECTION AND A PHOTOREACTIVE MATERIAL

(75) Inventors: Michael W. Hayes, Belleville, IL (US); David M. Baer, Fenton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/808,164

(22) Filed: Mar. 24, 2004

Related U.S. Application Data

(60) Provisional application No. 60/540,074, filed on Jan. 28, 2004.

(51) Int. Cl.[7] .............................................. B23K 26/00
(52) U.S. Cl. ................................................. 219/121.85
(58) Field of Search .................... 219/121.6, 121.68, 219/121.69, 121.83, 121.85; 347/224, 251; 264/400

(56) References Cited

U.S. PATENT DOCUMENTS

| | | | | |
|---|---|---|---|---|
| 5,397,686 A | * | 3/1995 | Dominick et al. | 430/346 |
| 5,818,507 A | * | 10/1998 | Genovese | 347/261 |
| 6,317,616 B1 | * | 11/2001 | Glossop | 600/407 |

* cited by examiner

*Primary Examiner*—Samuel M. Heinrich
(74) *Attorney, Agent, or Firm*—Thompson Coburn LLP

(57) ABSTRACT

A method of precision assembly of component parts of an article uses a laser light projection system in combination with a photoreactive material. The photoreactive material is applied to the component parts of the article being assembled, where the photoreactive material is exposed to the laser light emitted by the projector system. When the photoreactive material is exposed to the laser light, the appearance of the material changes to mark a location on the material and thereby on the component part where an assembly operation is to take place.

49 Claims, 2 Drawing Sheets

METHOD OF ASSEMBLING AN ARTICLE USING LASER LIGHT PROJECTION AND A PHOTOREACTIVE MATERIAL

This application claims the benefit of Provisional Patent Application No. 60/540,074 filed Jan. 28, 2004.

BACKGROUND OF THE INVENTION (1) Field of the Invention

The present invention pertains to a method of assembling articles using laser projection devices and a photoreactive material. More specifically, the present invention pertains to a method of assembling an article using one or more laser projectors and a material that is applied to the component parts of the article being assembled, where the material reacts when it is exposed to the laser light emitted by a projector. The material is applied to the article being assembled and when exposed to the laser light, the appearance of the material changes to mark a location on the material and thereby mark a location on the article where an assembly operation is to take place.

(2) Description of the Related Art

As a result of the competitive business environment, in businesses involving the assembly of large-scale articles such as automobiles, aircraft, large home appliances and others, there is a need to streamline the assembly of the component parts of the articles. A reduction in assembly time results in a reduction in manufacturing costs.

In the assembly of articles requiring a high degree of precision, specialized "hard" tooling is used to locate critical features of the component parts, for example fastener holes and fasteners, and to accurately position component parts relative to each other. As a further example, in assembling sections of a sheet metal body to a frame of an article such as an automobile or aircraft, a tool is manually positioned in engagement with a portion of the frame and a portion of the sheet metal section to properly position the sheet metal section relative to the frame. This enables the sheet metal section to be accurately attached in its desired position relative to the frame. In the assembly of a large article such as an automobile or aircraft, a large number of assembly tools would be designed and manufactured, with each tool being used to accurately position different component parts of the article being assembled. Each of these assembly tools is expensive to design, to manufacture, and to store and maintain. The use of assembly tools also contributes to inefficiencies in assembling of an article because an individual involved in the assembly of the article must retrieve, use and then store the assembly tool each time it is utilized in the assembly of the article.

Laser projection systems were designed to overcome the disadvantages associated with the use of assembly tools in the assembling of large-scale articles requiring precision assembly. Laser projection systems project laser light onto the component parts of the article being assembled. Typically, the software of the laser projection system utilizes a computer aided design (CAD) model of the article being assembled and makes calculations based on the CAD model to direct the laser light beam of the laser projection system in the desired pattern. The projected laser light is used to accurately locate machined portions of the component parts. For example, the laser light projection would be used to accurately locate drilled holes. Laser projection systems are also used to accurately project illuminated lines and curves onto the surfaces of the article being assembled to precisely identify assembly locations of component parts relative to each other during the assembly of the parts. The projection of the lines and curves onto the article being assembled is useful for, among other things, locating where component parts are to be assembled on the article without requiring hard tooling, and for confirming the configurations of the article when compared to the nominal design dimensions of the article.

However, one of the drawbacks in using layer projection systems in the assembly of articles is that the line of projection of the laser light to the assembly area must be maintained. In the assembly of large articles such as automobiles and aircraft, it is often necessary for several individuals to work in the assembly area assembling component parts of the article. As the individuals move about in the assembly area, they often move into the path of the laser light projection, thus obstructing the projection and the display of assembly information on the article provided by the laser light. To overcome this problem, it was necessary to "scribe" or trace the projected information onto the component part. This added significantly to the assembly time, and often lead to errors in the "scribed" information.

SUMMARY OF THE INVENTION

The present invention provides a method of assembling articles, for example automobiles, aircraft, and other types of articles that require precision positioning of at least some of their component parts, using light projection systems. The method of the invention makes use of known light projection systems, such as the model LPT1 manufactured by Laser Projection Technologies of Londonderry, N.H. The operation of the laser projection devices of the system of the invention is controlled by control software of the system, as is known in the art. A principle benefit of the invention is obtained by the use of a photoreactive material in conjunction with the laser projection system. The photoreactive material is applied to the surface of a component part of the article being assembled, and the laser light of the system produces a semi-permanent mark or indication on the surface of the component part through the reaction of the laser light with the photoreactive material. The markings produced by the photoreactive material on the component parts provide assistance to the individuals assembling the component parts in precisely positioning the component parts and/or checking the positioning of the component parts during assembly of the article. With the marks being produced on the component parts by the reaction of the laser light with the photoreactive material, the marks are not obstructed by the individuals assembling the article moving in front of the projected laser light. Because the individuals assembling the article are free to move about the assembly area without concerns for obstructing the projected laser light, the assembly of the article becomes more time efficient and more cost efficient.

The method of assembly of the present invention employs several of the known method steps of assembling an article employing projected laser light. At least one component part of the article to be assembled is positioned in an assembly area, and one or more laser light projectors are positioned in the assembly area. The laser light projector is controlled to emit laser light toward the component part in the assembly area where the laser light will be projected onto a surface of the component part.

A photoreactive material is applied to the surface of the component part in the area illuminated by the laser light. The photoreactive material can be provided in several forms. As one example, the material could be in the form of a self-adhesive tape or film applied to the surface of the component part. The photoreactive material can also be applied to the surface of the component part as a liquid that is sprayed onto the component part, as a dust that is dusted onto the component part, as a paste that is rubbed onto the component part, etc. When the laser light illuminates the photoreactive material applied to the surface of the component part, the pattern of the laser light projection creates a marking on the photoreactive material.

Movement of the laser light can be controlled to create a variety of different types of markings on the photoreactive material applied to the surface of the component part. The laser light can be moved to create cross-hair indications on the treated surface of the component part where holes are to be produced in the part, or where fasteners are to be located on the part. Lines can be formed on the treated surface of the component part by the movement of the laser light to provide a visual indication of the position of where a second component part is to be positioned relative to the one component part when assembling the two parts together. In addition, the movement of the laser light could project graphics onto the photoreactive material applied to the surface of the component part that provide information on a second component part to be assembled to the one component part, for example dimensions and materials of a fastener to be used with the one component part.

After the assembly of the article is completed, the photoreactive material applied to the surfaces of the component parts is removed. The removal of the photoreactive material is dependent on the form of the photoreactive material used. For example, the photoreactive material applied as a liquid spray would preferably be water based, enabling the easy removal of the photoreactive material from the surface of the assembled article by spraying or wiping water over the surface. A photoreactive material applied as a dust to the surface of the article component parts could be removed by a vacuum or by wiping the material from the surface. Photoreactive material applied to the surface of the component part as a paste would preferably be water based, enabling easy removal of the paste from the part's surface by spraying or wiping water over the surface. The material applied as a tape could be pulled from the article after assembly.

The method of the invention provides the benefits of the use of laser projection systems in the assembly of articles, without the associated disadvantage of avoiding interruption of the projected laser light. The method enables the maintaining of the accuracy of the laser projected data, as well as providing a quick and efficient manner of delivering required assembly information directly to the individuals assembling the article.

BRIEF DESCRIPTION OF THE DRAWING FIGURES

Further features of the invention are set forth in the following detailed description of the preferred embodiment of the invention, and in the drawing figures wherein.

DETAILED DESCRIPTION OF THE PREFERRED EMBODIMENT

Figure 1:
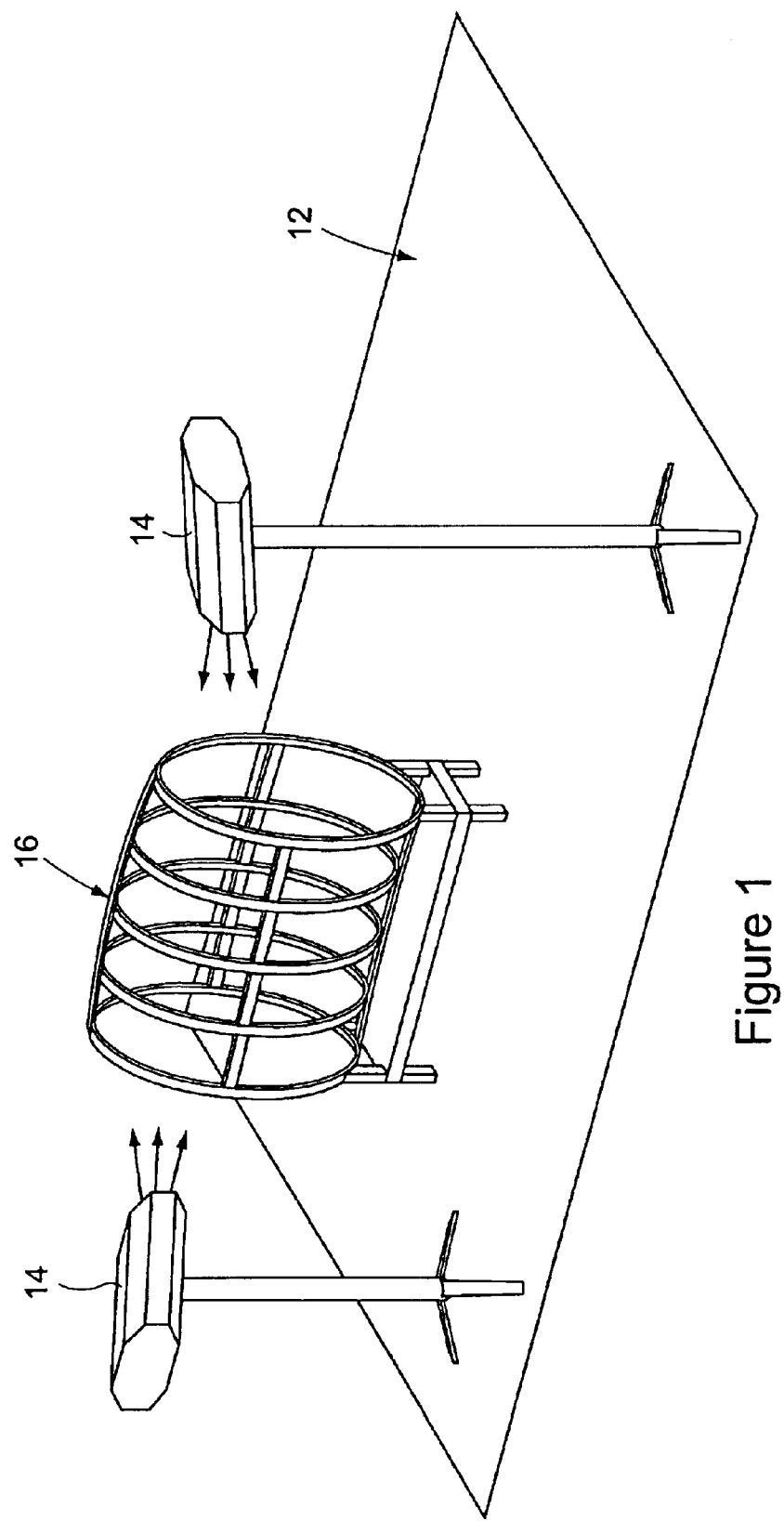
FIG. 1 is a schematic representation of an assembly area in which the method of the invention is used.

As stated earlier, the present invention provides a method of assembling the component parts of an article, for example, assembling the component parts of an automobile or an aircraft to name only two examples, where the assembly of certain component parts requires a great deal of precision in the positioning of the component parts, and where projected light systems are employed to assist in the precision positioning of the component parts. The method of the invention makes use of the known laser light projection systems, for example the Model LPT1 manufactured by Laser Projection Technologies of Londonderry, N.H. Laser projection systems of this type and their method of use are known. The operation of a laser projection system is controlled by the control software of the system. Typically, the software of the laser projection system utilizes a computer aided design (CAD) model of the article being assembled, and makes calculations based on the information provided by the CAD model to direct the laser beam of the laser projection system in a desired pattern into an assembly area where the article is being assembled.

A novel feature of the method of the invention is the use of a photoreactive material in conjunction with the laser projection system. The photoreactive material reacts to the wave length of the laser light projected by the laser light projection system and changes in appearance, for example changing in color, at the portions of the photoreactive material on which the laser light is directed. Only those portions of the photoreactive material on which the laser light is directed change in appearance. The remainder of the photoreactive material remains unchanged. Thus, the change in the appearance of the photoreactive material, and the control of the movement of the laser light directed onto the photoreactive material enables producing markings on the surfaces of the component parts of the article being assembled to which the photoreactive material has been applied. Various types of markings can be produced on the photoreactive material to assist the individuals assembling the component parts of the article in precisely positioning the component parts and/or checking the positioning of the component parts during the assembly of the article. These markings will remain on the photoreactive material as individuals move about the assembly area and move into the line of projection of the laser light obstructing the laser light. Because the individuals assembling the article are free to move about the assembly area without concerns for obstructing the projected laser light and without the necessity of scribing or tracing the laser light projected information onto the component part, the assembly of the article becomes more time efficient and more cost efficient.

It is necessary to use different types of photoreactive materials with different laser projection systems having different wavelengths. In the illustrative embodiment of the invention to be described in which the above-identified laser projection system is employed, the photoreactive material employed is XP-4200, manufactured by the Rohm and Hauss Company of Philadelphia, Pa.

As stated earlier, the method of the present invention employs several of the known method steps of assembling the component parts of an article employing projected laser light. FIG. 1 shows a schematic representation of an assembly area 12 in which the method of the invention is practiced. In the assembly area 12, one or more laser light projectors 14 are positioned at predetermined positions where the laser light projected from the projectors 14 will be directed toward areas of an article being assembled where the precision positioning of the articles component parts is necessary. In FIG. 1 a pair of laser light projectors 14 is shown. Depending on the article being assembled, one laser light projector may be sufficient, or a larger number of laser light projectors may be needed. As is known in the art, the laser light projected from each of the projectors 14 is controlled by the software of the laser light projection system. The control software (not shown) not only controls the direction of the projected laser light, but also controls the duration of the projected laser light.

At least one component part 16 of the article to be assembled is positioned in the assembly area 12 at a predetermined location relative to the predetermined location of at least one laser light projector 14. Depending on the size of the article being assembled, it may be desirable to first position the one component part 16 of the article in the assembly area 12 before positioning the laser light projector 14 in the assembly area. In the illustrative example of FIG. 1, the one component part 16 is shown as a tubular or cylindrical frame that could be a frame for a fluid containing tank, a frame for a section of aircraft fuselage or a frame from some other similar article. The one component part 16 shown in FIG. 1 is only an example of a component part of an article with which the method of the invention may be practiced. The component part 16 should not be interpreted as limiting.

The photoreactive material, in the illustrative embodiment XP4200, is applied to the surface of the component part 16 in the areas toward which the laser light of the projectors 14 is directed. There are several ways in which the photoreactive material could be applied to the component part 16 in accordance with the invention. In addition, the photoreactive material could be applied to the component part 16 in many different forms. In one example, the entire component part 16 could be immersed in the photoreactive material in a liquid form. In further examples, the photoreactive material could be sprayed onto the entire component part 16, or only portions of the component part, as a liquid spray or fine particulate dust. The photoreactive material could also be rubbed onto the surface of the component part 16 as a paste.

Figure 2:
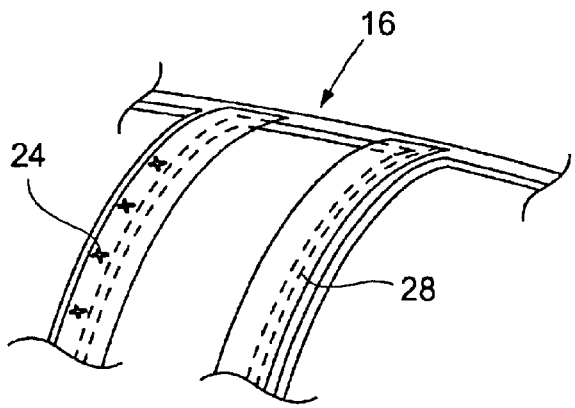
FIG. 2 shows a portion of a component part of an article with which the method of the invention is used.

In the illustrative embodiment shown in the drawing figures, the photoreactive material is provided in the form of a flexible tape 22 shown in FIG. 2. The tape 22 is applied to an area of the surface of the component part 16. The photoreactive material tape 22 is applied in those areas in which precision assembly operations are required on the component part 16. In some applications it may be required to cover a substantial area or the entire surface of the component part 16 with the photoreactive material tape 22. In other situations it may only be necessary to cover a certain, limited area of the surface of the component part 16.

Figure 3:
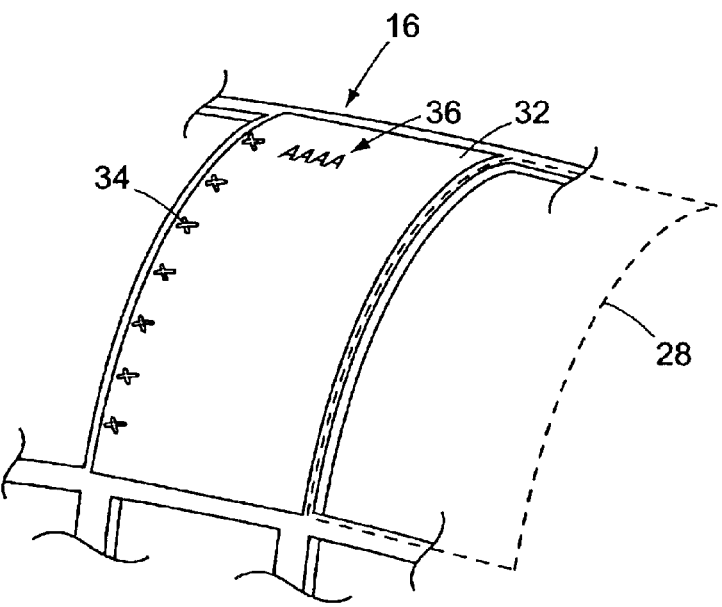
FIG. 3 shows component parts of an article with which the method of the invention is used; and, FIG. 4 shows component parts of an article with which the method of the invention is used.

With the photoreactive material tape 22 having been applied to the surface of a component part 16 in the desired area of the surface, the laser light projector 14 is controlled by its control software to direct laser light in a predetermined pattern onto the photoreactive material tape 22. The laser light from the projector 14 illuminating portions of the photoreactive material tape 22 causes those portions of the tape to change in appearance. In one example, the tape 22 of photoreactive material could be substantially clear before reacting with the laser light. As it reacts with the laser light and subsequent to the reaction with the laser light, those portions of the photoreactive material tape 22 onto which the laser light is directed would change in appearance, for example, changing to a color. The control system of the laser light projector 14 controls the laser light to move in a predetermined pattern that in turn traces or illuminates a predetermined pattern on the photoreactive tape 22. The movement of the laser light causes the illuminated portions of the photoreactive material tape 22 to change in appearance to depict the pattern of the laser light illuminating the portions of the tape. The control of the laser light can cause the change in appearance of the photoreactive tape to depict a cross hair 24 (shown in FIGS. 2 and 3) that locates a precision point in which an assembly operation, for example, the drilling of a hole should be positioned.

Figure 4:
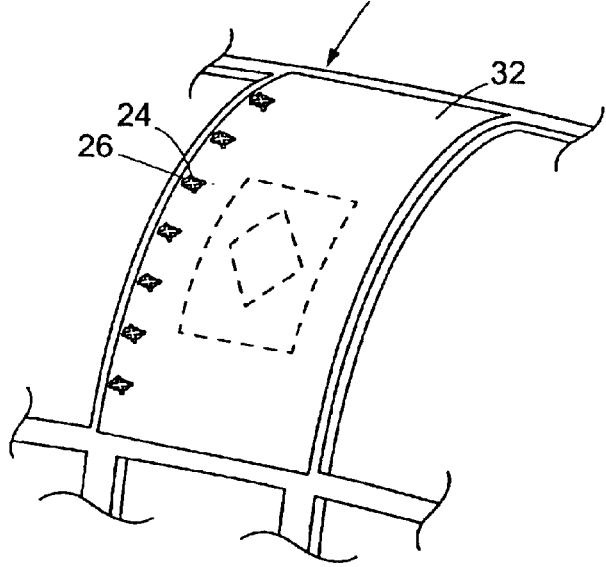

As a further example (shown in FIG. 4), the cross hair 24 could provide a precision location for a fastener 26 to be located in the component part 16. This information could be used to position the fastener 26 on the component part 16, or check that the fastener 26 has been properly positioned on the component part 16.

In a still further example, the predetermined pattern of the directed laser light could cause the photoreactive material tape 22 to react and change in appearance to depict a line 28 (shown in FIGS. 2 and 3) relative to the one component part 16 where a second component part, for example a section of sheet metal 32 is to be positioned and attached to the one component part 16. The projected laser light could cause the photoreactive material tape 22 to react and produce an indication of the both a line where the sheet material 32 is to be positioned, as well as cross hairs 34 indicating the positions of fasteners to hold the sheet material 32 to the one component part 16.

Still further, the controlled movement of the projected laser light could cause the photoreactive material tape 22 to react to depict graphic information 36 on the one component part 16, for example dimensions and materials of a fastener to be used with the one component part 16 and/or the torque to be applied to the fastener when attaching it to the component part.

After the assembly of the component parts 16,32 of the article has been completed, the photoreactive material 22 applied to the surfaces of the component parts is removed. The removal of the photoreactive material is dependent on the form of the photoreactive material used. In the illustrative example of the photoreactive material tape 22 described herein, after the assembly operations performed on the component part 16 are completed, the tape 22 is easily removed by peeling the tape from the areas of the component part 16 to which it had been applied.

When the photoreactive material is used in the form of a liquid that is sprayed on the surface of the component part 16, preferably the liquid is water-based, enabling the easy removal of the photoreactive material from the surface of the component part 16 by spraying or wiping water over the surface.

A photoreactive material applied as a dust to the surface of the component part 16 could be removed by a vacuum or by wiping the material from the surface.

A photoreactive material applied to the surface of the component part 16 as a paste would also preferably be water-based, enabling easy removal of the paste from the part's surface by spraying or wiping water over the surface.

The method of the invention provides the benefits of the use of laser projection systems in the assembly of an article's component parts, without the associated disadvantages of avoiding interruption of the projected laser light or the need to "scribe" the data displayed onto the component part of the assembly. The method enables maintaining the accuracy of the laser light projected data, as well as providing a quick and efficient manner of delivering required assembly information directly to the individuals assembling the component parts of an article.

Although the method of the invention has been described above by reference to specific embodiments, it should be understood that modifications and variations can be made to the method of the invention without departing from the intended scope of the following claims.

What is claimed is:

1. A method of assembly using light projection, the method comprising:

positioning at least one light projector in an assembly area where an article is to be assembled;

positioning at least one component part of the article in the assembly area;

positioning a photoreactive material near the component part;

causing the light projector to project light onto the photoreactive material and change an appearance of a portion of the photoreactive material;

performing an assembly operation on the component part at a location on the component part that is near the portion of the photoreactive material.

2. The method of claim 1, further comprising:
using a laser light projector as the light projector.

3. The method of claim 1, further comprising:
positioning a plurality of laser light projectors in the assembly area, with the one light projector being a laser light projector of the plurality of laser light projectors.

4. The method of claim 1, further comprising:
positioning a plurality of component parts in the assembly area, with the one component part being one of the plurality of component parts.

5. The method of claim 4, further comprising:
positioning the plurality of component parts near each other.

6. The method of claim 4, further comprising:
positioning the plurality of component parts against each other.

7. The method of claim 1, further comprising:
positioning the photoreactive material on the component part.

8. The method of claim 7, further comprising:
positioning the photoreactive material in a tape form on the component part.

9. The method of claim 8, further comprising:
removing the photoreactive material from the component part by peeling the photoreactive material in the tape form from the component part.

10. The method of claim 7, further comprising:
positioning the photoreactive material on the component part by spraying the photoreactive material in a particulate form on the component part.

11. The method of claim 10, further comprising:
the particulate form being an atomized liquid.

12. The method of claim 10, further comprising:
removing the photoreactive material from the component part by wiping the photoreactive material from the component part.

13. The method of claim 10, further comprising:
the particulate form is a dust.

14. The method of claim 13, further comprising:
removing the photoreactive material from the component part by wiping the photoreactive material from the component part.

15. The method of claim 7, further comprising:
positioning the photoreactive material on the component part by applying the photoreactive material in a liquid form to the component part.

16. The method of claim 15, further comprising:
applying the photoreactive material to the component party by immersing the component part in the photoreactive material.

17. The method of claim 15, further comprising:
applying the photoreactive material to the component part by wiping the photoreactive material on the component part.

18. The method of claim 15, further comprising:
applying the photoreactive material to the component part by spraying the photoreactive material on the component part.

19. The method of claim 15, further comprising:
the liquid form being a clear liquid.

20. The method of claim 15, further comprising:
the liquid form being a water-based liquid.

21. The method of claim 7, further comprising:
positioning the photoreactive material on the component part by rubbing the photoreactive material on the component part.

22. The method of claim 1, further comprising:
causing the light projector to project light onto the photoreactive material for a predetermined time period.

23. The method of claim 1, further comprising:
causing the light projector to project light onto the photoreactive material in a predetermined pattern of the projected light.

24. The method of claim 23, further comprising:
the predetermined pattern of the projected light being a continuous pattern.

25. The method of claim 23, further comprising:
the predetermined pattern of the projected light projecting graphic information.

26. The method of claim 1, further comprising:
performing the assembly operation of producing a hole in the component part at the location on the component part that is near the portion of the photoreactive material.

27. The method of claim 1, further comprising:
performing the assembly operation of attaching a fastener to the component part at the location on the component part that is near the portion of the photoreactive material.

28. The method of claim 1, further comprising:
performing the assembly operation of positioning a second component part at the location on the one component part that is near the portion of the photoreactive material.

29. The method of claim 1, further comprising:
performing the assembly operation of checking the location of an edge on the component part for proper positioning of the edge relative to the component part.

30. The method of claim 1, further comprising:
performing the assembly operation of checking the location of a fastener on the component part for proper positioning of the fastener relative to the component part.

31. The method of claim 1, further comprising:
performing the assembly operation of checking the position of a second component part relative to the one component part for proper positioning of the second component part relative to the one component part.

32. A method of assembling component parts of an article, the method comprising:
positioning at least one component part of the article in an assembly area that is exposed to light emitted from a light projector;
positioning a photoreactive material on the component part;
causing the light projector to project light onto the photoreactive material and change an appearance of a portion of the photoreactive material;
performing an assembly operation on the component part at a location on the component part at which the portion of the photoreactive material is positioned.

33. The method of claim 31, further comprising:
using a laser light projector as the light projector.

34. The method of claim 32, further comprising:
positioning a plurality of component parts in the assembly area, with the one component part being one of the plurality of component parts.

35. The method of claim 34, further comprising:
positioning the plurality of component parts against each other.

36. The method of claim 32, further comprising:
positioning the photoreactive material in a tape form on the component part.

37. The method of claim 36, further comprising:
removing the photoreactive material from the component part by peeling the photoreactive material in the tape form from the component part.

38. The method of claim 32, further comprising:
positioning the photoreactive material on the component part by spraying the photoreactive material in a particulate form on the component part.

39. The method of claim 38, further comprising:
the particulate form being a liquid.

40. The method of claim 38, further comprising:
removing the photoreactive material from the component part by wiping the photoreactive material from the component part.

41. The method of claim 38, further comprising:
the particulate form is a dust.

42. The method of claim 32, further comprising:
positioning the photoreactive material on the component part by applying the photoreactive material in a liquid form to the component part.

43. The method of claim 42, further comprising:
applying the photoreactive material to the component party by immersing the component part in the photoreactive material.

44. The method of claim 32, further comprising:
applying the photoreactive material to the component part by wiping the photoreactive material on the component part.

45. The method of claim 32, further comprising:
positioning the photoreactive material on the component part by rubbing the photoreactive material on the component part.

46. The method of claim 32, further comprising:
performing the assembly operation of producing a hole in the component part.

47. The method of claim 32, further comprising:
performing the assembly operation of positioning a second component part at the location on the component part.

48. The method of claim 32, further comprising:
performing the assembly operation of checking the location of an edge on the component part for proper positioning of the edge relative to the component part.

49. The method of claim 32, further comprising:
performing the assembly operation of checking the position of a second component part relative to the one component part for proper positioning of the second component part relative to the one component part.

* * * * *